United States Patent [19]
Wahler et al.

[11] 3,969,843
[45] July 20, 1976

[54] DEVICE FOR GRAFTING GRAPEVINES

[76] Inventors: Eugen Wahler; Hans Wahler, both of Buchhaldenstr. 21, 7056 Weinstadt-Schnait, Germany

[22] Filed: Dec. 29, 1975

[21] Appl. No.: 645,214

[30] Foreign Application Priority Data
Oct. 21, 1975  Germany...................... 7533447[U]

[52] U.S. Cl. .................................................. 47/6
[51] Int. Cl.² .......................................... A01G 1/06
[58] Field of Search.................. 47/1, 6; 144/90–91

[56] References Cited
UNITED STATES PATENTS

| | | | |
|---|---|---|---|
| 30,617 | 11/1860 | Crawford | 47/6 |
| 2,219,654 | 10/1940 | La Fata | 47/6 |
| 2,368,420 | 1/1945 | Masunaga | 47/6 |
| 3,680,255 | 8/1972 | Grigorov | 47/6 |

FOREIGN PATENTS OR APPLICATIONS

| | | | |
|---|---|---|---|
| 28,588 | 3/1925 | France | 47/6 |
| 23,606 | 4/1901 | Switzerland | 47/6 |
| 55,689 | 5/1911 | Switzerland | 47/6 |

*Primary Examiner*—Robert E. Bagwill
*Attorney, Agent, or Firm*—Joseph A. Geiger

[57] ABSTRACT

A device for grafting plant scion to plant stock, especially of grapevine, where a vertically movable thin cutter blade attached to a foot-operable or mechanically operable carriage has an omega-shaped cutting profile which produces interlocking tooth joints and whose shape is such that the upwardly returning blade retains the cut shoots thereon, thereby allowing cutting of a second shoot while the first shoot remains attached to the blade and joining both shoots by removing them at the same time. A toggle mechanism operates the removal of the two shoots after every second cutting cycle.

18 Claims, 9 Drawing Figures

DEVICE FOR GRAFTING GRAPEVINES

BACKGROUND OF THE INVENTION

1. Field of the Invention

The present invention relates to devices for cutting and joining plant shoots, and more particularly to a device for mechanically grafting plant scion onto plant stock, especially of grapevine.

2. Description of the Prior Art

Grafting involves the end-to-end connection of a shoot of a superior plant, so-called scion, onto a branch or shoot of an inferior plant, so-called stock. Several different kinds of graft joints are known, among them cleft joints, splice joints, tongue joints, and saddle joints, all using acutely angled cuts on the extremities of the scion and stock. The more common types of graft joints are the tongue joint and the saddle joint which produce a wedging action between the joined extremities. Generally, the manually performed cutting operations are time consuming and required considerable skill and physical effort.

It has therefore already been suggested to mechanize the grafting process by using a device in which the graft cutting is performed by a guided knife blade. A known device of this type has a thin knife blade which is shaped so as to produce the graft cut for both the scion and the stock, the former having a central longitudinal protrusion, much like a tooth, which engages a matching recess in the latter. The shape of the tooth resembles the Greek letter omega, or a U-shape with undercut sides, with the result that the joined extremities of scion and stock are longitudinally interlocked. In order to produce this cut, the shaped knife blade is attached to a vertically movable carriage whose motion may be produced by the means of a treadle or by means of a pneumatic linear actuator. The scion or stock to be so cut is held in place inside a V-groove.

This known device further features a means for retaining the cut scion on the shaped knife, while the latter cuts the extremity of the stock in a second cutting stroke, so that, as the shaped scion and stock are removed from the omega-shaped knife of the device, they are at the same time also joined together. The means which removes the scion from the shaped knife thus operates only during every second knife stroke, requiring a special mechanism for its operation. This mechanism includes an ejector member which is vertically movable with the knife blade, except when its upward motion is stopped through a transversely movable latch pin, thereby causing the ejector member to remove the scion from the knife blade. The latch pin is spring-biased away from the ejector member and driven towards the latter by means of a disc cam whose large and small radii engage and release the latch pin, respectively. The rotation of the disc cam is such that it advances during each stroke of the knife blade and carriage from a large radius to a small radius, or vice versa, a ratchet wheel on the disc cam shaft being engaged by the carriage during each downward stroke, thereby producing the disc cam motion.

This device is complex and subject to wear and noise on the latch driving mechanism. The complexity of the latter also means that the device is comparatively expensive to manufacture.

SUMMARY OF THE INVENTION

Underlying the present invention is the primary objective of devising an improved grafting device which is especially adapted for the grafting of grapevines, and in which the mechanism for the latch operation is simiplified and improved, so as to be less expensive to manufacture and more reliable in operation. Other objectives of the present invention are aimed at the improvement of various constituent components of the grafting device, including the mechanization of its drive.

In order to meet the above objectives, the present invention suggests a grafting device comprising: a base plate adapted for mounting on a table or some other suitable support; a V-shaped transverse groove in the base plate for the centered positioning of the scion and stock; a vertical carriage guide extending upwardly from the base plate; a carriage moving vertically along said guide between an upper and lower end position; a thin shaped cutter blade attached to the carriage and having its cutting edge oriented generally transversely to the V-groove in the base plate, with a cutter contour resembling the shape of the Greek letter "omega"; a normally vertically movable, but selectively blockable ejector member associated with the shaped portion of the knife blade so as to remove from it a cut scion, when the ejector member is blocked by a latch pin, but leaving the scion attached to the knife blade, when it is not blocked; and a stationary stripper adapted to remove from the opposite side of the shaped knife blade a cut stock shoot, whereby the simultaneous operation of the ejector member and stripper bracket causes the cut scion and stock extremities to be joined; the selective control means including: a horizontally guided latch pin which is movable into the upward path of the ejector member and which is spring-biased away from the latter, and a toggle cam on a horizontal pivot axis arranged transverely to the latch pin and movable between two positions corresponding to the released and engaged positions of the latch pin, the toggle cam having a generally triangular toggle tooth cooperating with a striker roller attached to the vertically moving carriage, thereby tripping the toggle cam in the course of each carriage stroke from one toggle position to the other.

In a preferred embodiment of the invention, the latch pin control means takes the form of a U-shaped toggle cam which is pivotably supported on a horizontal transverse shaft in such a way that the base portion of the V-shape engages the outer extremity of the latch pin, pushing the latter in the direction of the ejector member, when the toggle cam tooth is in the inner one of its two positions, ans releasing the latch pin under its spring bias, when the toggle cam is moved to its outer position.

One leg portion of the U-shaped toggle cam is preferably in the shape of a generally triangular tooth with straight flanks, a rounded point, and rounded cradle portion at the base of the tooth, so that the striker roller on the downwardly advancing carriage engages one of the two cradle portions on the side of the toggle tooth, thereby lowering it, while the other one is raised in a toggle cam rotating motion. The point of the toggle tooth is accordingly always positioned on one or the other side of the path of the striker roller, deflecting the latter to the tooth flank and the foot of the raised cradle position. The result is that the striker member on the carriage will trigger the toggle cam to its other position, just prior to reaching the bottom position iin its cutting stroke, while the striker member executes a horizontal correcting motion against oppositely biased centering springs on a guide shaft of the carriage.

The preferred invention further suggests that the toggle cam be provided with a detent or frictional resistance against angular motion which will not be overcome by the force of the latch pin release spring. The preferred embodiment further suggests that the latch pin and the selectively blockable ejector member be so arranged that the pin is engageable above the ejector member against a butt portion of the latter and that, as long as the latch pin remains disengaged, the ejector member rides on the cut scion, which is held and carried by the shaped knife blade, without removing the scion from the knife blade. The arrangement of the ejector member to ride loosely on top of the engaged scion makes it possible to immediately perform a second cutting stroke on the stock, while the scion remains attached to the shaped cutting blade. During this second cutting stroke, the severed piece of stock pushes the attached scion and the ejector member riding above it further up on the shaped cutter blade. The device of the invention makes it possible to then simultaneously strip the scion and the stock from the shaped cutter blade, thereby automatically joining them while the shaped cutter blade is temporarily still positioned inbetween, being retracted upwardly, as the stationary stripper bracket and the now blocked ejector member respectively prevent the stock and the scion from moving upwardly with the cutter blade.

In one preferred embodiment, the vertical movement of the carriage is obtained by means of a foot treadle pulling the carriage downwardly with an adjustable linkage, while the upward return movement is produced by a pair of compression springs. The carriage rides on two parallel vertically oriented guide columns.

In another preferred embodiment of the invention, the foot treadle and linkage are replaced with a linear actuator, preferably a pneumatic drive cylinder, which is mounted underneath the base plate of the device in vertical alignment with the carriage guide. If a double-acting cylinder is used, the carriage return springs can be dispensed with.

BRIEF DESCRIPTION OF THE DRAWINGS

Further special features and advantages of the invention will become apparent from the description following below, when taken together with the accompanying drawings which illustrate, by way of example, several embodiments of the invention, respresented in the various figures as follows.

DESCRIPTION OF THE PREFERRED EMBODIMENTS

Referring particularly to FIGS. 1, 2, 3, and 6 of the drawing, there can be seen a device for graft-cutting and joining scion and stock material, the device consisting essentially of an elongated flat base plate 10 to the lower side of which are attached two spaced longitudinal edge profiles 11. The device is adapted for mounting on a stationary support such as a work table (not shown), the edge profiles 11 of the base plate 10 supporting the device on the table surface. On its forward side, which is the right-hand side in FIGS. 1 and 6, the base plate 10 has an integral horizontal panhandle-type extension 12. On the upper side of this extension 12 is arranged a transverse V-shaped positioning groove 13 in the midportion of which is embedded a resilient cushion 14. The centering groove 13 and the cushion 14 serve to position and support the scion and the stock which are to be cut and joined. A generally rectangular groove-like longitudinal recess 15 on the upper side of the base plate 10 extends across the V-shaped positioning groove 13 in the area of the cushion 14.

In the central portion of the base plate 10 is mounted an upright support 16, designed to serve as a vertical straightline guide 17. The latter consists of two transversely spaced parallel guide columns 18 and 19 (FIG. 2) engaging matching guide bores 68 and 69 of a cutter carriage 22. As FIG. 6 indicates, the carriage 22 is a block of generally T-shaped horizontal cross-sectional outline, the guide bores 68 and 69 being arranged in the cross bar of the "T". The two guide columns 18 and 19 are press-fitted into the base plate 10, loose spacer rings 20 on the guide columns serving as lower stops for the carriage 22, when the latter is moved downwardly in a cutting stroke. Adjustment of the height of the spacer rings 20 serves to adjust the cutting action, which takes place on the resilient cushion 14, and which is to be described in detail further below.

Figure 6:
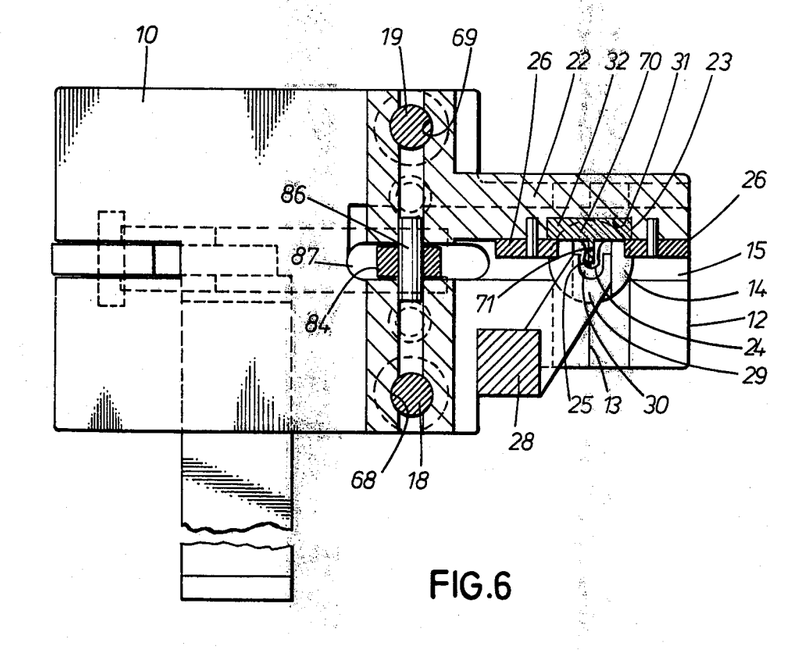
FIG. 6 is a horizontal cross section through the device of FIGS. 1–6, taken along lines VI—VI of FIG. 1.
Figure 6A:
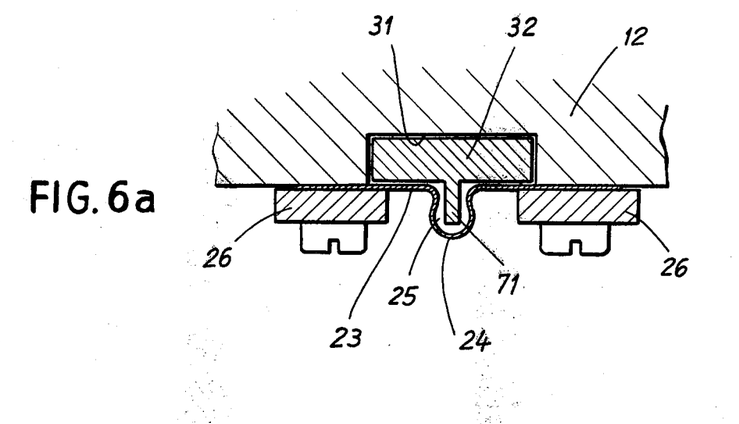
FIG. 6a shows a portion of FIG. 6 at an enlarged scale.

On the stem portion of the T-shaped carriage 22, which extends transversely to the positioning groove 13 and generally in alignment with the transverse groove 15 of the base plate 10, is fixedly mounted a cutter blade 23 which can best be seen in FIGS. 6 and 6a. The cutter blade 23 is a thin piece of shaped high strength steel, having a cutting profile resembling the Greek letter "omega". Its shape may also be compared to a "U" with laterally undercut legs. The bow portion 24 of the cutter 23 thus defines a vertical groove 25 whose center plane coincides with a vertical center plane through the V-shaped positioning groove 13 of the base plate 10.

A downward motion of the carriage 22 of the attached cutter blade 23 against a shoot positioned in the groove 13 thus produces an axially oriented groove in the cut on one of the severed extremities and a matching axially oriented tooth-like protrusion on the other cut extremity. The cut extremities will neatly fit together, since they are made with the same cutter blade. Two spaced vertically oriented clamping plates 26 attached to the forwardly extending stem portion of the carriage 22 hold the shaped cutter blade against a vertical clamping face of the carriage 22, four clamping screws being used for this purpose.

In the midportion of the clamping face of the carriage 22 and vertically above the positioning groove 13 of the base plate 10 is further arranged a shallow rectangular groove 31 which serves as a vertical guide for an ejector member 32 of likewise T-shaped cross-sectional contour. As FIG. 6a indicates, a thin stem portion of the ejector member 32 reaches into the vertical groove 25 of the cutter blade 23, while the much heavier cross bar portion of the ejector member is received inside the guide groove 31, being guided by the three flanks of the guide groove 31 and by the back side of the shaped cutter blade 23. The ejector member 32 is thus vertically movable relative to the attached cutter blade 23.

Figure 3:
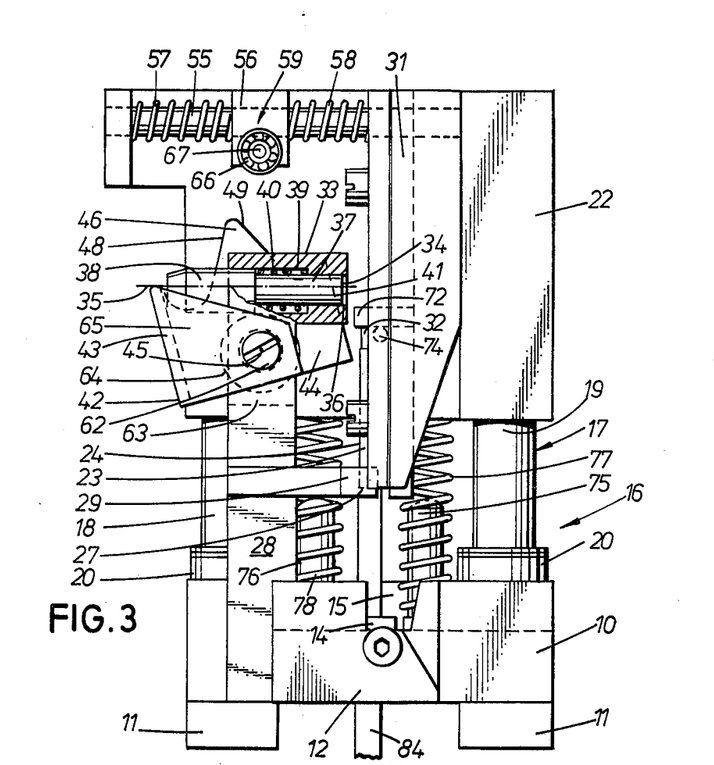
FIG. 3 shows the upper part of the device of FIG. 1, as seen from the front side.

In addition to carrying the guide columns 18 and 19, the base plate 10 of the device further carries a generally vertically extending support arm 28 which is attached to the side of the extension 12 of the base plate 10. This support arm 28 carries at approximately mid-height a stripper bracket 29 which extends horizontally towards the bow portion of the cutter blade 23, surrounding it with a U-shaped recess 30, but without touching it. As can be seen in FIG. 3, the stripper bracket 29 has its lower edge arranged a small distance below the fully raised cutting edge 27 of the shaped cutter blade 23. The lower extremity of the vertically movable ejector member 32 is shown to be at the same level as the lower edge of the stripper bracket 29.

The vertical support arm 28 further carries on its upper end portion a latch head 33 which can best be seen in FIG. 3. This head holds a horizontally transversely oriented latch pin 34, the axis 35 of which coincides with the vertical plane which is defined by the positioning groove 13 and by the center line of the cutter blade. The latch pin 34 is thus aimed towards the vertically movable ejector member 32, having a shaft portion 37 which is extendable into the path of the ejector member 32, just above the latter, when the carriage is in its upper rest position. A guide bore 36 in the head 33 receives the shaft portion 37 of the latch pin 34, a larger countersunk guide bore portion 39 receiving a matching latch pin head 38. In the annular space defined between the shaft portion of the pin and the countersunk guide bore portion 39 is arranged a compression spring 40 which, by engaging axially oppositely facing ring shoulders of the guide bore and of the latch pin 34, urges the latter out of engagement with the ejector member 32.

The horizontal position of the latch pin 34 is controlled by means of a generally U-shaped toggle cam 42 which can best be seen in FIG. 3. While its two leg portions 44 and 65 are arranged respectively behind and in front of the latch head 38 (see also FIG. 1), the connecting portion 43 of the toggle cam extends across the outer extremity of the latch pin 34, holding the latter against its compression spring 40. The U-shaped toggle cam 42 is attached to the vertical support arm 28 underneath the latch head 38 by means of a horizontal pivot whose axis 45 is defined by a shoulder bolt 62 (FIG. 1) or a suitable pivot pin.

Figure 4:
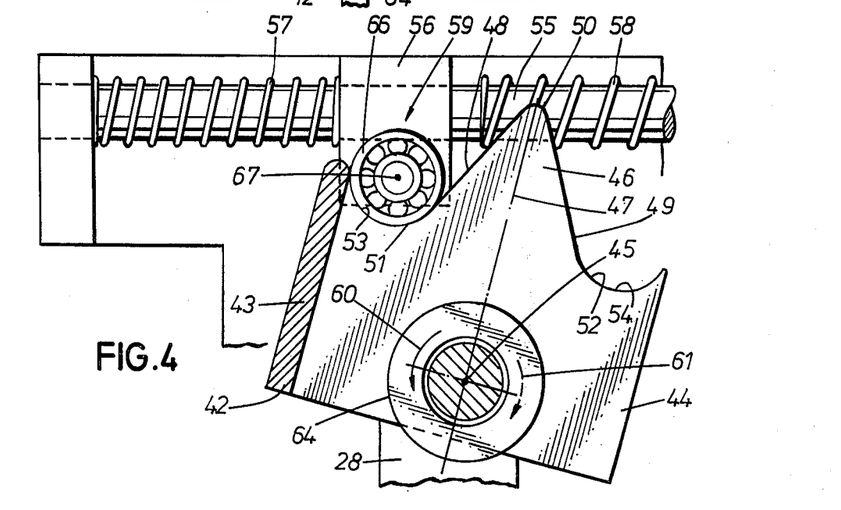
FIG. 4 shows an enlarged, partially cross-sectioned detail of FIG. 3 in a different operating position.

The toggle cam 42 is shown in more detail in FIG. 4, where the second, engaged position of the toggle cam 42 is given, while FIG. 3 shows the first, disengaged toggle cam position.

The toggle cam consists essentially of a triangular cam profile in the form of a toggle tooth 46 extending upwardly from the pivot center 45 to a rounded point 50, the angle bisector of the toggle tooth extending through the pivot center 45. The two angular positions of the toggle cam tooth 46 are offset from the vertical direction by approximately equal angles on opposite sides thereof, so that a downwardly moving striker roller 59, attached to the vertically moving carriage 22, engages either the outer flank 48 or the inner flank 49 of the toggle tooth 46. In either case, the striker roller 59, while moving downwardly, is itself deflected inwardly or outwardly on a horizontal guide rod 55 of the carriage 22, where oppositely acting compression springs 57 and 58 tend to center the striker roller 59 in vertical alignment with the pivot center 45.

FIG. 4 shows the striker roller 59 at a position during its downward motion shortly before the end of that motion, just as it engages the cradle portion 53 at the outer foot 51 of the toggle tooth 46. A similar cradle portion 54 is arranged at the inner foot 52 of the tooth 46. As FIG. 4 indicates, the striker roller 59 has already been deflected outwardly a certain distance by the inclined outer tooth flank 38, before reaching the cradle portion 53. Additional downward motion of the striker roller will now force the roller to execute an angular motion around the pivot center 45, thereby rotating the toggle cam 42 in the direction of arrow 60, as it moves downwardly and also slides outwardly on its guide rod 55. The lower end position reached by the striker roller 55 is indicated by the position of the cradle portion 53 in FIG. 3.

Although during the upward return motion of the striker roller 59, the compressed spring 57 will have a tendency to mvoe the toggle tooth 46 back to a central position, the springs 57 and 58 are made soft enough to avoid this result. Similarly, in the toggle cam position shown in FIG. 4, the compressed latch pin spring 40 will have a tendency to move the latch pin 34 and the toggle cam 42 outwardly in the direction of the arrow 60. Both are effectively prevented by one or more elastic friction washers 64 arranged between the leg portion 44 of the U-shaped toggle cam 42 and a slot 63 (FIG. 1) in the vertical support arm 28 which acomodates that portion of the leg portion 44 which engages the shoulder bolt 62. Through rotation of the latter, it is possible to adjust the level of frictional resistance which holds the toggle cam in place. The friction washers 64 could, of course, also be replaced by a suitable detent mechanism engaging the toggle cam 42 in both end positions.

As can readily be seen in FIG. 3, the next downward stroke of the carriage 22 will cause the striker roller 59 to engage the inner flank 49 of the toggle tooth 46, producing a reverse angular motion of the toggle cam 42 in the direction of the arrow 61 in the bottom portion of the carriage stroke, thereby engaging the latch pin 34 into the path of the ejector member 32. The striker roller 59 is preferably a ball bearing 66 carried on a horizontal bearing pin 67 which is mounted on a slide 56. The latter is arranged to move horizontally inwardly and outwardly on the guide rod 55, the slide 56 being a generally rectangular block engaging a face of the carriage 22, so as not to rotate around the guide rod 55, when the striker roller 59 engages the inner or outer flank of the toggle cam 42.

FIG. 3 shows the ejector member 32 in its lowermost position with respect to the carriage 22, a butt 72 of the upper end of the ejector member 32 being engaged by a stop pin protruding from the forward clamping plate 26. A similar stop pin 73 is arranged in the rear clamping plate 26 (see FIG. 1). In this lowermost position, the bottom extremity of the ejector member 32 is vertically aligned with the lower side of the stripper bracket 29, both being located a short distance below the cutting edge 27 of the shaped cutter 23. As can be seen in FIG. 3, the upper edge of the butt 72 is located just below the level of the latch pin 34. This signifies that, when the extremity 41 of the latch pin 34 is engaged over the butt 72, the ejector member 32 cannot move above its position shown in FIG. 3.

The vertically movable carriage 22 receives its upward motion from two compression springs 77 and 78 which are arranged in vertical orientation between countersunk bores in the base plate 10 and a bottom face of the carriage 22. Two studs 75 and 76 position the compression springs 77 and 78, respectively. The downward motion or cutting stroke of the carriage 22 is obtained by means of a treadle linkage 21 which cna be seen in FIGS. 1 and 2. This linkage consists essentially of a treadle bar 79 extending downwardly from a pivot connection 80 with the base plate 10, the treadle bar 79 carrying at its lower end a pedal 81 attached thereto by means of tow screws 82. A short distance below the upper end of the treadle bar 79 is welded to it a forwardly extending bracket 83 whose distant extremity carries the lower end of an upwardly extending drive link 84 on a pivot pin 85, the upper end of the link 84 being attached to the drive carriage 22 by means of a pivot pin 86.

These linkage members convert a horizontal swivelling motion on the pedal 81 of the treadle bar 79 into a generally downwardly and rearwardly oriented swivelling motion of the pivot pin 85 about the pivot pin 80, and from this motion is obtained a downward cutting stroke of the vertically guided carriage 22. The drive link 84 is arranged centrally with respect to the carriage 22, reaching vertically through the base plate 10, which has a suitable aperture 87 for this purpose. On the forwardly extending bracket 83 is further arranged a stop bolt 89 engaging a threaded bore 91 in the bracket 83. A counter nut locks the stop bolt in place. The latter, by engaging the lower side of the base plate 10 with its upwardly pointing shaft extremity, determines the upper rest position of the carriage 22, holding this position against the compression springs 77 and 78. The stop bolt 89 is preferably so adjusted that the upper position of the carriage 22 is as shown in FIG. 3, with the upper edge of the butt 72 of the ejector member 32 positioned just below the level of the latch pin 34.

Figure 5:
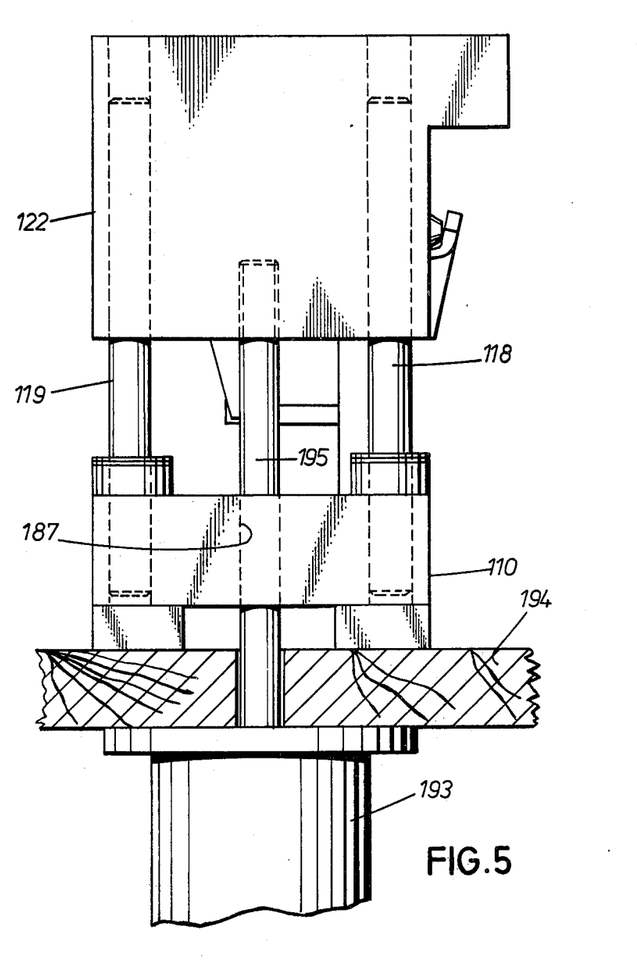
FIG. 5 shows a second embodiment of the invention, as seen from the rear side.

In FIG. 5 is shown a power drive version of the device, where the foot treadly linkage of the previously described embodiment has been replaced with a double-acting pneumatic linear actuator 193. FIG. 5 otherwise features components which are identical or similar to those found in the embodiment of FIGS. 1–3, identical or similar parts having reference numerals with a 100-digit added thereto. The piston rod 195 of the pneumatic cylinder 193 extends parallel to and between the two vertical guide columns 118 and 119 for the carriage 122, being attached to the latter by means of a threaded connection. Vertical adjustability of the latter allows for an adjustment of the upper rest position of the carriage, while spacer rings on the guide columns 118 and 119 again determine the lower end position of the carriage 122. A suitable source of compressed air and a control valve, preferably of the foot operated type, are not shown in the drawing, since they are well-known commercially available items.

Figure 7:
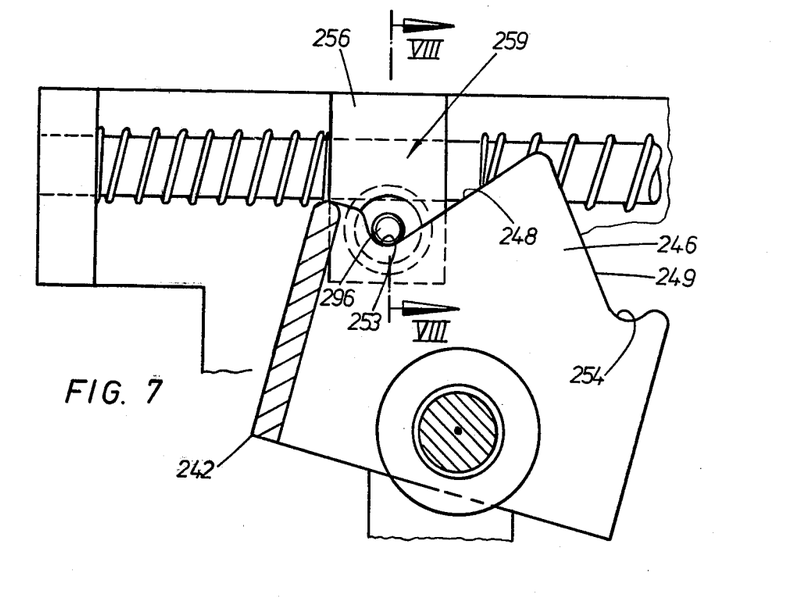
FIG. 7 shows a modified tripping mechanism comparable to the of FIG. 4.
Figure 8:
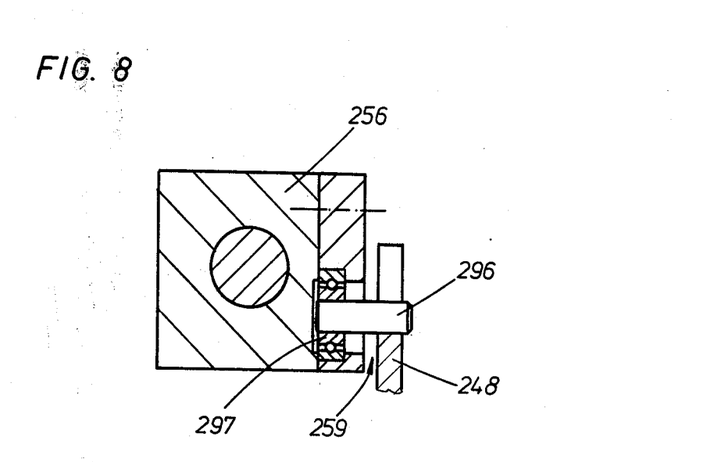
FIG. 8 is a partial cross section through the mechanism of FIG. 7, taken along line VIII—VIII thereof.

A modified embodiment of the toggle cam and cooperating striker member on the carriage 22 is illustrated in FIGS. 7 and 8. Here, the parts and features which are similar to those of the first-described embodiment of FIGS. 1–3 are designated with reference numeral to which a 200-digit has been added.

The modification resides essentially in a reversal of the striker member, inasmuch as the slide 256 holds the outer race of a ball bearing 297 from which extends a striker pin 296 which alternatingly engages the flanks 248 and 249 of the toggle cam tooth 246.

Figure 1:
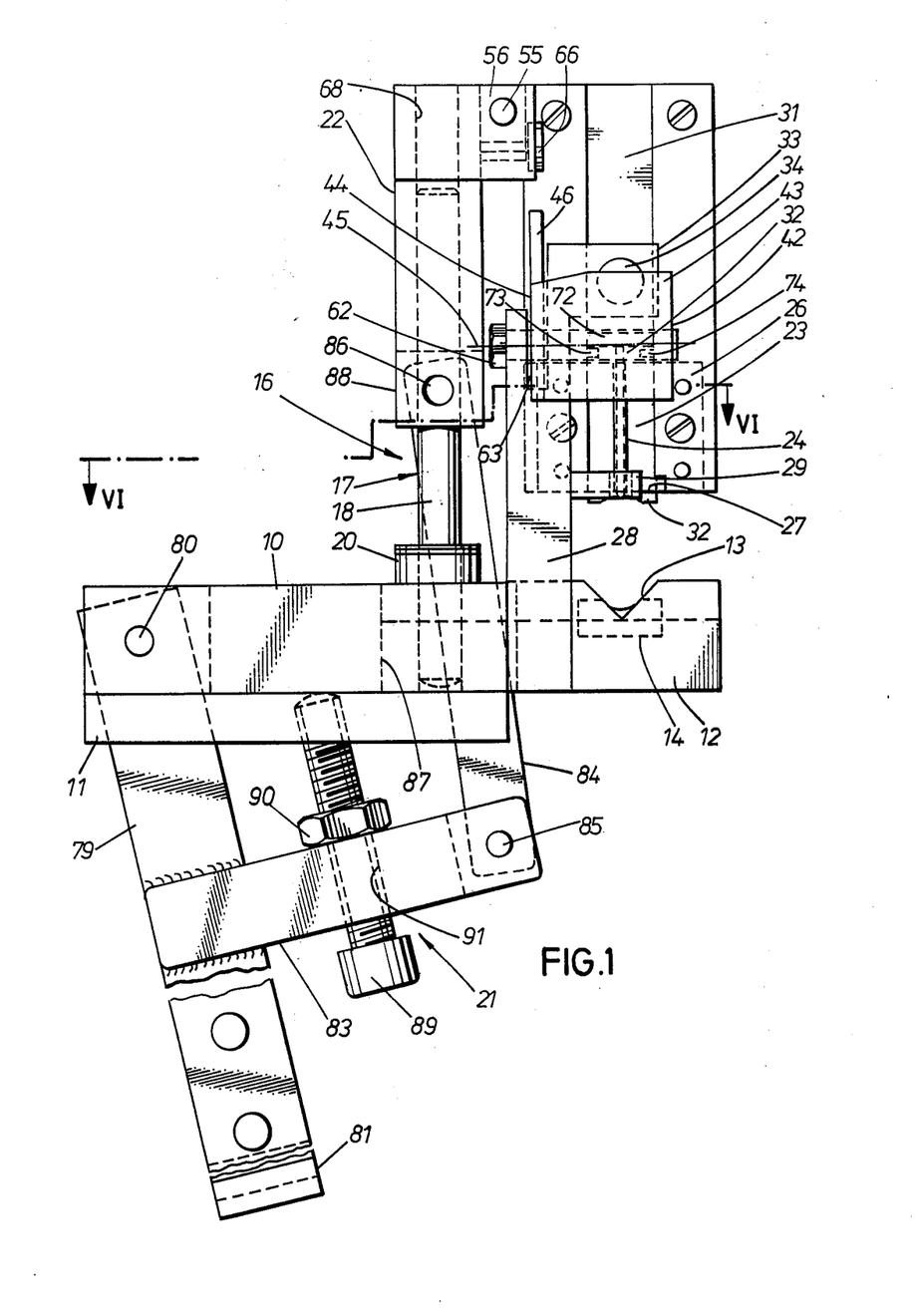
FIG. 1 shows a grafting device embodying the invention, seen in an elevational side view, with the cutter carriage in its raised rest position.
Figure 2:
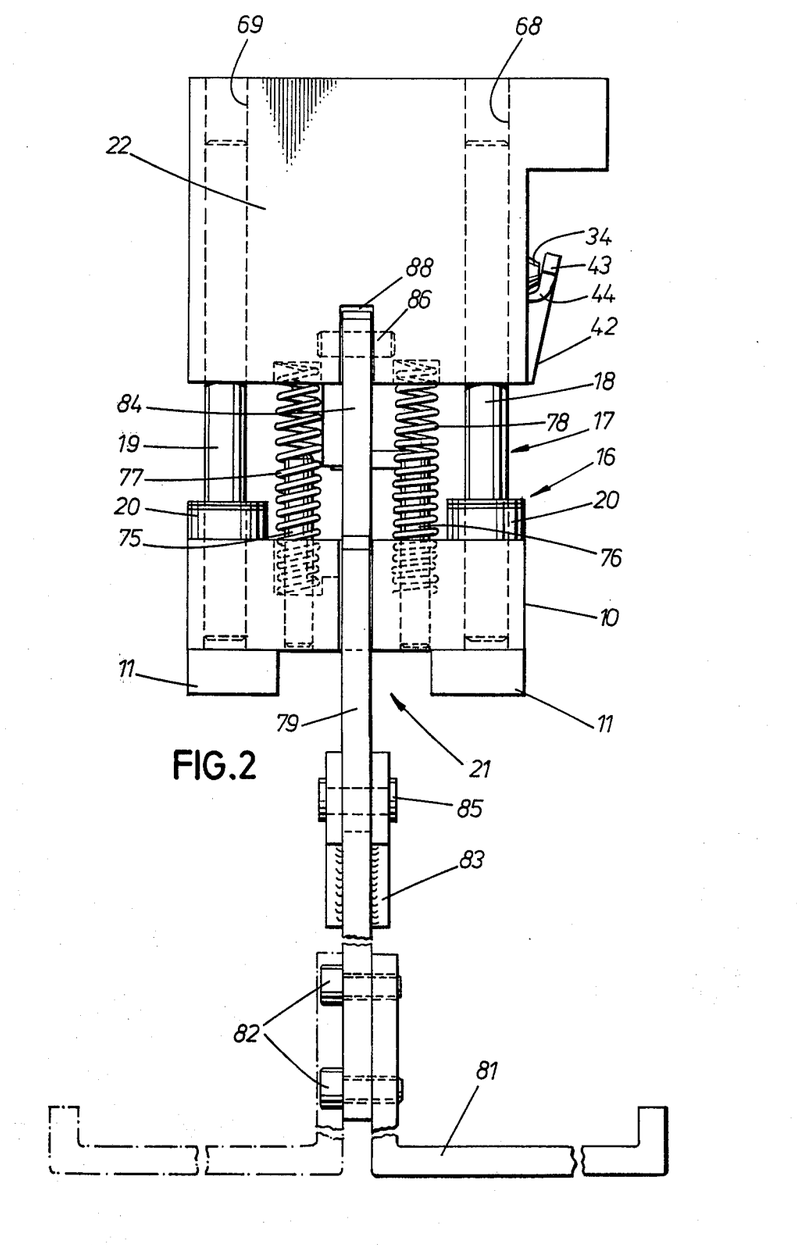
FIG. 2 shows the device of FIG. 1, as seen from the back side.

The novel grafting device of the invention, as illustrated and described hereinabove, operates as follows:

The operator is preferably seated in front of the device, i.e. to the right of the device shown in FIG. 1. Before starting the operation of the grafting device, he will ascertain that the toggle cam 42 is in that position in which it holds the latch pin 34 engaged above the ejector member 32. This means that the toggle cam 42 has to have the position as shown in FIG. 4 of the drawing. The operator then first introduces a scion shoot, positioning the latter inside the V-shaped positioning groove 13 in such a way that the scion itself will remain on the right-hand side of the cutter blade 23 and a short clipping will be severed therefrom and remain on the left-hand side of the blade 23. Although this is not a strigent requirement, it is normally preferably to produce the omega-shaped graft joint in such a way that the tooth-like protrusion is cut on the scion extremity, while the matching recess or tooth gap is cut into the stock.

The operator will now actuate the foot treadle mechanism or the pneumatic drive of the device, respectively, to perform a first cutting stroke during which the carriage 22 moves down and up again to the normal rest position which is shown in the drawing. The shaped cutter blade, moving downwardly against the resilient cushion 14 at the bottom of the positioning groove 13, has thereby completely severed a clipping from the scion. However, as the omega-shaped cutter blade moves back up, it entrains with it both the scion and the clipping, because neither can readily move laterally away from the cutter blade, due to the undercut flanks of the cut contour. Whereas the clipping on the left-hand side of the cutter blade is inevitably stripped from the latter due to the presence of the stripper bracket 29, the scion itself remains attached to the cutter blade 23, because the ejector member 32, though resting with its weight on top of the attached scion, is free to move upwardly beyond the position shown in FIG. 3, thereby allowing the scion to remain attached to the cutter blade 23. This additional upward displacement of the ejector member 32 is possible, because the latch pin 34 has been retracted during the cutting stroke, the striker member 59 on the carriage having tripped the toggle cam 42 from the position shown in FIG. 4 to the position shown in FIG. 3.

While the scion remains attached to the raised cutter blade 23, the upper end of the stock is introduced into the positioning groove 13, so that the stock extends to the left-hand side of the cutter blade 23. The device is now operated for a second cutting stroke during which the cutter blade 23 penetrates through the stock to the cushion 14, severing a clipping from the stock. As the cutter blade 23 penetrates into the stock, the scion attached to the right-hand of it comes to rest on top of the clipped portion of the stock, so that it is shifted further up on the cutter blade, all while the ejector member 32 rests on top of the scion. Simultaneously, the downward movement of the striker member 59 has now again triggered the toggle cam 42, returning the latter to the engagement position of the latch pin 34 (position shown in FIG. 4).

As the carriage 22 and its cutter blade 23 now return upwardly to their rest position, the cutter blade 23 lifts with it on its left-hand side the cut stock and on its right-hand side the cut scion and the stock clipping, the stock and stock clipping remaining still in alignment. However, the fact that the latch pin 34 has been engaged above the butt 72 of the ejector member 32 means that the latter is now prevented from moving upwardly beyond the position shown in FIG. 3, so that the upward motion of the scion and stock clipping will be stopped as soon as the butt 72 reaches the extended extremity 41 of the latch pin 34. While the stock, having not yet reached the fixed stripper bracket 29, thus continues its upward movement with the cutter blade 23, the stock clipping is seperated from the upwardly moving cutter blade 23 and the stock moves into horizontal alignment with the scion on the opposite side of the shaped cutter blade 23. This is so, because the lower face of the stripper bracket 29 is horizontally aligned with the bottom end of the blocked ejector member 32, as shown in FIG. 3.

The aligned position of the stock and scion means that the omega-shaped tooth of the scion is now engaged in the matching recess of the stock, except that the thin cutter blade 23 is still interposed between the two contours. As the carriage and cutter blase continue their upward motion to the upper rest position, both the stock and the scion are now simultaneously stripped from the cutter blade 23, while they remain joined at their contoured extremities. At the termination of the return stroke of the carriage 22, the operator has holding in his or her hands a joined scion and stock, both the cutting and joining operations having been performed by the grafting device. Following removal of the stock clipping from the device, the latter is now ready for the introduction of a new scion shoot. Conveniently, the extremity of the scion can be used to remove the stock clipping from the positioning groove 13, as the extremity of the stock can be used to remove the clipping of the scion.

As can readily be deduced from the simplicity of the operating procedure described above, the entire grafting operation, when performed with the novel device of the invention, takes only very little time to perform — the time for successively introducing the scion from the right, operating the carriage, introducing the stock from the left, and operating the carriage again — while necessitating a minimum of skill on the part of the operator. The device of the invention has proved itself effective for grafting applications using stock of any diameter between 5 and 14 mm.

It should be understood, of course, that the foregoing desclosure describes only preferred embodiments of the invention and that it is intended to cover all changes and modifications of these examples of the invention which fall within the scope of the appended claims.

We claim the following:

1. A device for graftting plant shoots, especiallly grapevines, by cutting and joining the extremities of scion and stock in a contoured joint in which the scion is held by the stock both longitudinally and in axial alignment, the device comprising in combination:
    a stationary base plate having arranged thereon shoot positioning means defining a generally horizontal transverse shoot axis;
    a vertically movable cutter blade of thin stock defining a generally vertical plane at right angles to the shoot axis and having a cross-sectional shape which produces a transverse cut on the shoots with a central bulge resembling the shape the Greek letter omega, so that cut extremities have matching tooth and tooth gap shapes, the cutter blade having a corresponding vertical fold profile defining a bead on one side and a groove on the other side thereof;
    means for moving the cutter blade in a generally vertical reciprocating motion, so as to cause the cutter blade to sever a first shoot which is positioned underneath it, in the shoot axis of the shoot positioning means;
    means for retaining the cut extremity of the first shoot on the upwardly moving cutter blade, while the cutter blade severs a second, oppositely extending shoot which has subsequently been positoned underneath it, in the shoot axis; and
    means for releasing the first shoot from the cutter blade simultaneously with the second shoot, while joining the extremities of both on their shaped cuts, said releasing means including:
    an upwardly movable ejector member arranged laterally adjacent to the fold profile of the cutter blade above the shoot axis;
    a stationary stripper bracket arranged adjacent to the fold profile of the cutter blade, on the opposite side of the ejector member, so as to remove from the cutter blade any clipping or shoot that may be carried upwardly by the fold profile of the blade by blocking the upward movement of the clipping or shoot;
    latching means for selectively blocking the upward mobility of the ejector member by engaging the latter at a level at which the blocked ejector member forcibly removes the previously retained first shoot from the upwardly moving cutter blade by blocking the upward movement of the former;
    toggle means for alternatingly engaging the latching means against the ejector member, when the cutter blade performs a cut on the second shoot, and not engaging the latching means against the ejector member, when the cutter blade performs a cut on the first shoot.

2. A grafting device as defined in claim 1, wherein the cutter blade moving means includes: a cutter carriage to which the cutter blade is fixedly attached, a drive mechanism adapted to move the carriage downwardly from an upper rest position to a lower cutting position, and spring means opposing said movement in such a way that the carriage is returned to its rest position, when the drive mechanism is deactivated after a downward movement of the carriage.

3. A grafting device as defined in claim 2, wherein the drive mechanism is a foot-operable treadle which is pivotably attached to the base plate of the device and engages the carriage with a connecting linkage.

4. A grafting device as defined in claim 2, wherein the drive mechanism includes a linear actuator driven by a pressure medium, including an actuating rod which is operatively connected to the cutter carriage.

5. A grafting device as defined in claim 1, wherein the cutter blade moving means includes: a cutter carriage to which the cutter blade is fixedly attached, and a double-acting linear actuator driven by a pressure medium including an actuating rod which is operatively connected to the cutter carriage.

6. A grafting device as defined in claim 1, wherein the cutter blade moving means includes: a stationary vertically extending straight-line carriage guide which is solidary with the base plate of the device, a cutter carriage engaing the carriage guide and carrying the cutter balde fixedly attached to it, and means for vertically moving the cutter carriage between the upper rest position of the carriage and a lower cutting positon of the carriage;
the first shoot releasing means further includes a vertical straight-line guide in the cutter carriage for the movements of the ejector member, the ejector member and its guide being arranged on that side of the cutter blade on which its fold profile presents a groove; and
the ejector member is biased downwardly while being movable upwardly along its guide, through a carrying action of the retained first shoot, when said latching means is not engaged.

7. A grafting device as defined in claim 6, wherein the first shoot releasing means further includes, as part of the ejector member guide, stop means for limiting the downward displacement of the ejector member to a low end position relative to the cutter carriage in which the lower end of the ejector member is positioned in the vicinity of the lower edge of the cutter.

8. A grafting device as defined in claim 6, wherein the cutter carriage has a generally vertically extending mounting face for the cutter blade and includes means for clamping the latter against said face;
the ejector member guide is defined in part by a vertical groove in the cutter blade mounting face and in part by that side of the cutter blade which is contiguous with the mounting face; and
the ejector member has a butt portion on its upper end which is accessible to the latching means from that side of the cutter blade which faces away from the mounting face.

9. A grafting device as defined in claim 8, wherein the ejector member, in its lowest position relative to the cutter carriage and cutter blade, reaches above the cutter blade; and
the latching means includes a latch pin oriented horizontally and perpendicularly to the vertical plane of the cutter blade, the latch pin being movable longitudinally for selective engagement into the path of the ejector member above the latter.

10. A grafting device as defined in claim 1, wherein the cutter blade moving means includes: a stationary vertically extending straight-line carriage guide which is solidary with the base plate of the device, a cutter carriage engaging the carriage guide and carrying the cutter blade fixedly attached to it, and means for vertically moving the cutter carriage in a cutting cycle from an upper rest position of the carriage to a lower cutting position of the carriage and back to its rest position; and
the toggle means for alternatingly engaging the latching means against the ejector member includes:
a toggle member which is pivotably supported on a stationary support member attached to the base plate, the toggle member being movable between a first angular position in which it holds the latching means in engagement into the path of the ejector member and a second angular position in which the latching means is disengaged from the path of the ejector member;
a striker member which is operatively connected with the cutter carriage, so as to execute a striking motion against the toggle member during each cutting cycle movement of the cutter carriage, whereby the striker member forcibly moves the toggle member from one angular position to the other; and
means for retaining the toggle member in its angular position during the return portion of the striking motion of the striker member.

11. A grafting device as defined in claim 10, wherein the toggle member includes a toggle cam, and the striker member includes a cam follower executing the vertical motions of the cutter carriage.

12. A grafting device as defined in claim 11, wherein the latching means includes a latch pin which is arranged inside a guide bore of a stationary part, for axial movements into and out of engagement in the ejector member path, and a spring biasing the latch pin in the direction away from engagement.

13. A grafting device as defined in claim 11, wherein the latching means includes a latch pin which is arranged for axial engaging and disengaging movements on a latch pin axis which is substantially perpendicular to the plane of the cutter blade and which is constituted by the bore of a stationary part;
the toggle cam is in the shape of a vertically oriented disc cam with an upwardly pointing tooth profile, the cam being pivotably supported on a horizontal cam pivot axis which is oriented perpendicularly to the latch pin axis and determined by said stationary part;
the latch pin is operatively connected to the toggle cam, at a radius from the cam pivot axis;
the first and second angular positions of the toggle cam tooth profile are substantially identically but oppositely inclined from a vertical mid-position;
the cam follower of the striker member is movable vertically with the cutter carriage motion along a movement axis which is substantially aligned with said toggle cam mid-position, so as to strike one flank of said tooth profile in the first cam position and the other flank in the second cam position; and
the striker member includes: means for executing a bilateral escape movement of the cam follower in relation to the cutter carriage, and centering means for returning the cam follower to its normal lateral position.

14. A grafting device as defined in claim 13, wherein the means for executing said cam follower escape movement includes a slide on which the cam follower is mounted, and means for guiding the slide in the direction of cam follower deflection on the toggle cam tooth profile; and
the cam follower centering means incudes a pair of springs biasing the cam follower slide in opposite directions towards its mormal lateral position.

15. A grafting device as defined in claim 13, wherein the disc-shaped cam further includes a cradle portion on each side of its tooth profile which is engageable by the cam follower during it downward motion in such a way that the cam follower moves the toggle cam, the cradle portions being arranged at such angular positions with respect to the toggle cam pivot axis that, in the lowermost position of the cam follower, the latter has rotated the toggle cam from one of its two cam positions to the other.

16. A grafting device as defined in claim 15, wherein the toggle member has the form of a U-shaped part of which one leg portion constitutes the vertically oriented disc-shaped toggle cam, and both leg portions have aligned bores that are engaged by a stationary male pivot member, thereby determining the toggle cam pivot axis; and the connecting portion between the two leg portions of the U-shaped part extends transversely to the axis of the latch pin, engaging that axial extremity of the latch pin which is opposite to the extremity with which the pin cooperates with the ejector member.

17. A grafting device as defined in claim 16, wherein the toggle member retaining means includes at least one axially reliliently compressible friction member between one of the two leg portions of said U-shaped part and a vertical face of the stationary part which determines the latch pin axis and the toggle cam axis.

18. A grafting device as defined in claim 17, wherein the latching means further includes a latch pin return spring biasing the latch pin in the direction away from engagement in the ejector member path; and the toggle member retaining means further includes means for adjusting the frictional resistance against rotation of the toggle member to a level at which the bias of the latch pin return spring will not move the toggle member.

* * * * *